Figure 1:
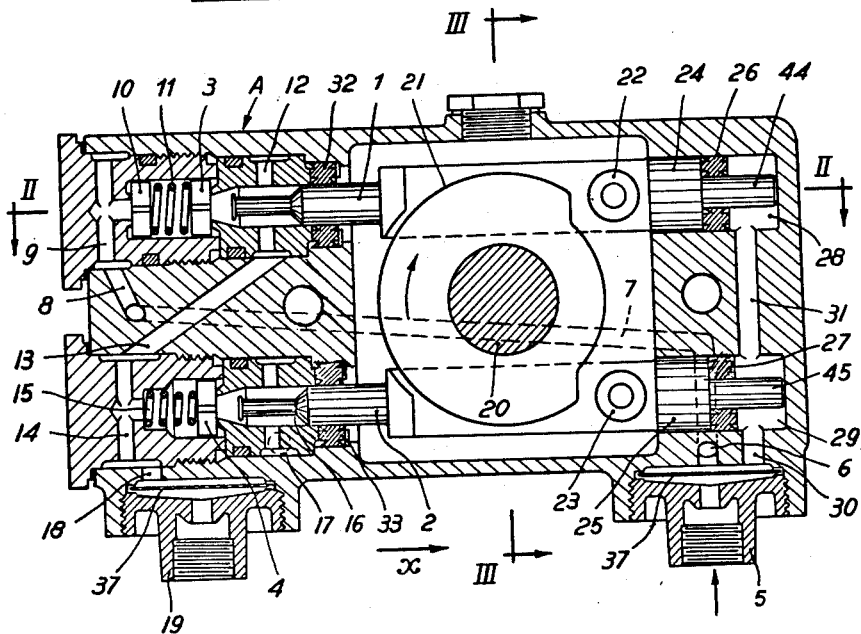

July 14, 1964  G. ALFIERI  3,140,725
SERVO ACTUABLE LEVELER FOR CONTROLLING PNEUMATIC
SUSPENSION SYSTEMS FOR VEHICLES

INVENTOR:
GIUSEPPE ALFIERI
ATTORNEYS

United States Patent Office  3,140,725
Patented July 14, 1964

3,140,725
SERVO ACTUABLE LEVELER FOR CONTROLLING PNEUMATIC SUSPENSION SYSTEMS FOR VEHICLES
Giuseppe Alfieri, Milan, Italy, assignor to Fabbrica Italiana Magneti Marelli S.p.A., Milan, Italy, a corporation of Italy
Filed Sept. 6, 1961, Ser. No. 136,324
Claims priority, application Italy Sept. 27, 1960
7 Claims. (Cl. 137—550)

The present invention relates to a servo-actuatable leveller for controlling pneumatic suspension systems for vehicles. In accordance with the invention, the leveler comprises a pair of piston and cylinder assemblies, with each piston having a rod extending therefrom and formed with a reduced extension. Each piston and cylinder assembly controls the opening of a normally closed valve, one of these valves being a compressed air inlet valve and the other valve being an exhaust valve. The respective valves are operated by the reduced extensions of the piston rods. Compression coil springs are associated with the two piston rods, and each of these coil springs biases its respective piston rod in a direction so as to maintain the reduced extension thereof out of operative association with the respective valve controlled thereby. Thus, the respective pistons are normally biased to what may be termed an inactive or retracted position.

Upon admission of compressed air to the leveler, the compressed air is effective upon the piston and cylinder assemblies to move both piston and their associated piston rods, toward a position in which the reduced extensions of the piston rods can operatively engage the respective valves to open the same. However, such movement of the respective piston rods toward operative engagement with the respective valves is limited by a control cam which is secured to rotate with a shaft, rotatably mounted in the body of the leveler, and having its axis extending perpendicular to the direction of movement of the piston rods. This cam has a neutral position in which, upon movement of the piston rods toward the operative valve opening position responsive to admission of compressed air or air under pressure to the piston and cylinder assemblies, it engages abutments on the respective piston rods to limit such movement to a position in which the reduced extensions are ineffective upon the associated valves.

The cam is so constructed and arranged that, upon rotation in one direction, it will provide for one or the other of the piston rods to open its associated valve while the other piston rod is maintained in a position where it is inoperative to open its associated valve. Thus, either the air inlet valve or the exhaust valve may be opened depending upon the particular angular position of the cam, and vice versa. When the supply of air under pressure to the body of the leveler is terminated, the respective compression coil springs bias the associated piston rods in the direction to move their abutments out of operative association with the cam, and to move the pistons and connected rods to the aforementioned inactive or retracted position.

The invention will now be described with reference to the appended drawings, which illustrate wholly exemplary embodiments of the invention.

Figure 2:
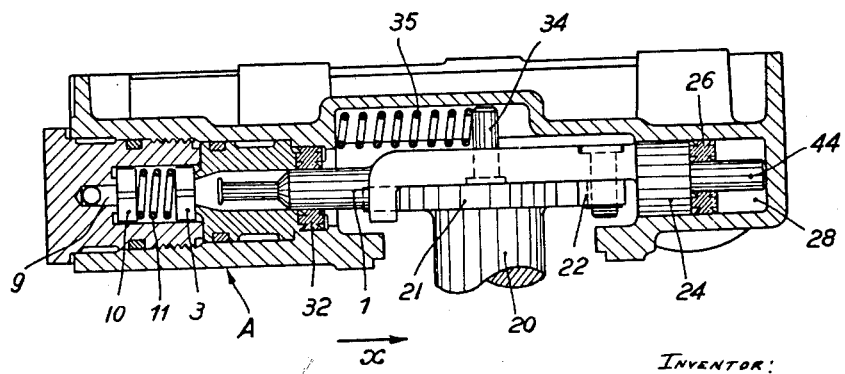
Figure 3:
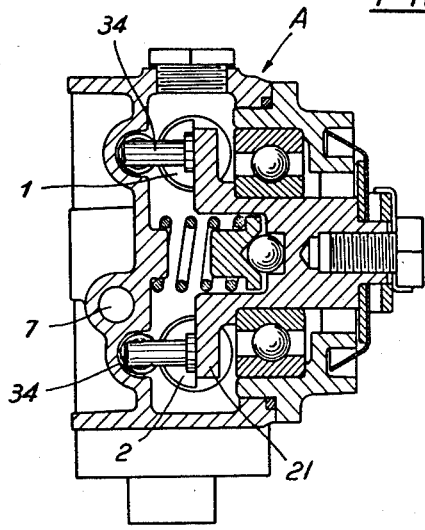
Figure 4:
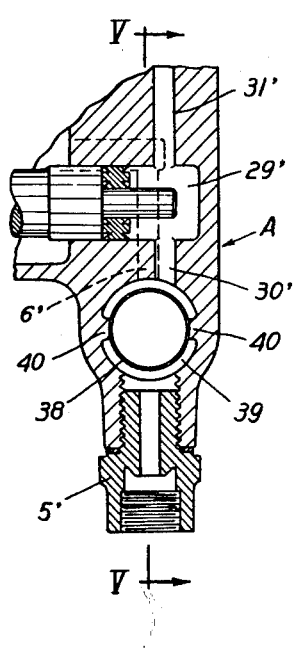
Figure 5:
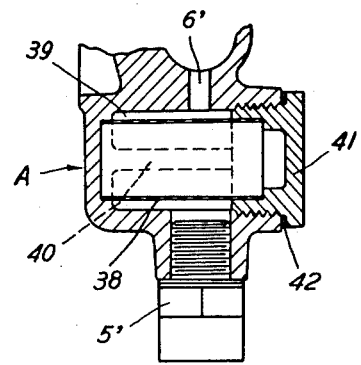

FIG. 1 is a longitudinal sectional view of a leveler according to one embodiment of the invention;
FIG. 2 is a section of the FIG. 1 taken on the lines II—II;
FIG. 3 is a cross-sectional view taken along lines III—III of FIG. 1;
FIG. 4 is a partial sectional view corresponding to the lower right-hand portion of FIG. 1 and illustrating an alternative embodiment of the invention; and FIG. 5 is a cross-sectional view taken along lines V—V of FIG. 4.

Referring to FIGS. 1, 2 and 3, the embodiment of the leveler illustrated therein includes a body A in which are slidably mounted, in parallel relation, push rods 1 and 2. Each push rod 1 and 2 is a piston rod, and is formed with a reduced extension at its left end, as viewed in FIGS. 1 and 2. The reduced extension of rod 1 is adapted to engage and open a normally closed valve member 3 controlling the supply of compressed air to the suspension system. The reduced extension of rod 2 is arranged to engage and open a normally closed valve member 4 controlling exhaust of air from the pneumatic suspension system.

The compressed air, intended for the air suspension system, is supplied to the fitting 5 and reaches, through the conduits 6, 7 and 8 the chamber 9, and hence, through the check valve 10, the chamber 11 upstream of the delivery valve member 3. Downstream of the valve member 3 the compressed air reaches, through the conduits 12, 13 and 14, the chamber 15 upstream of the discharge valve 4. The chamber 16, downstream of the valve 4 communicates with the discharge opening 17 (which communicates with the atmosphere).

The chamber 15 communicates, through the hole 18, with the outlet fitting 19 which is connected with the air valve fed by the apparatus. At its center part, body A rotatably supports a shaft 20 whose axis is perpendicular to the common central plane of the push rods 1 and 2. A radial cam 21 is keyed to shaft 20 to rotate therewith.

Cam 21 cooperates with the rollers 22 and 23, individually presented by each of the push rods 1 and 2. The said push rods at the ends thereof further from the valves 3, 4 are formed as pistons (24 and 25) with seal packings (26, 27), which pistons slide in their respective cylinders 28 and 29, supplied with compressed air through the conduits 30 and 31.

The cam chamber is separated from the valves by means of annular sealing packings 32 and 33 cooperating with the push rods 1 and 2, respectively.

Each push rod is provided with a pin 34, engaged with a respective coil spring 35, mounted in a recess in a body A and tending to displace the respective push rod in the direction of the arrow X (FIG. 2).

The operation of the apparatus is as follows:

When no compressed air is supplied to inlet 5, as when the leveler is deactivated, springs 35 displace rods 1 and 2 longitudinally in the direction of arrow X until piston extensions 44 and 45, respectively, engage the ends of cylinders 28 and 29, respectively. In such retracted position of pistons 24 and 25, rollers 22 and 23 are displaced from operative association with cam 21.

Consequently, any angular displacement of cam 21 by angular displacement of shaft 20 will not have any operative effect on the push rod and the valves 3 and 4 remain shut, thus maintaining the stability of the pressure conditions existing in the air springs before the inactivation of the leveller.

When the leveler is activated, either by manual or automatic means of a known type, compressed air supplied to fitting 5 enters cylinders 28 and 29 through passages 30 and 31, and also enters chamber 11 through passages 6, 7, and 8 and check valve 10. Push rods 1 and 2 are thus moved longitudinally in a direction opposite to arrow X and against the bias of springs 35 until the movement of piston rods 1 and 2 causes rollers 22 and 23 to contact the active surface of the cam 21. The latter is so shaped that, in its intermediate position (illustrated in the FIG. 1) the valves 3 and 4 are closed, whereas with a clockwise rotation the roller 22 is displaced in the direction of the arrow X in opposition to the action of the compressed air on the piston 24, and, therefore, the delivery valve 3 remains shut, while the roller 23, by the action of the compressed air on the piston 25, moves in a direction opposite to the arrow X, to open outlet valve 4, which puts the air valve or valves in communication with the discharge duct 17 through the fitting 19.

When cam 21 is angularly displaced in a counterclockwise direction, a reverse effect occurs. Thus, push rod 1 can open inlet valve member 3, whereas push rod 2 is restrained from opening outlet valve member 4. Accordingly, compressed air entering inlet fitting 5 is supplied to the pneumatic suspension system through fitting 19 by way of passages 12, 13, 14 and 18, with rod 2 blocking the exhaust outlet 17.

Upon deactivation of the leveler, the supply of compressed air to fittting 5 is interrupted. Thereupon, springs 35 are effective to move rods 1 and 2 to the right, as viewed in FIGS. 1 and 2, until extensions 44 and 45 of the pistons abut against the ends of the cylinders 28 and 29, respectively. Due to the closing of both valves 3 and 4, the air pressure within the pneumatic suspension system is maintained constant irrespective of dynamic oscillations or vibrations of the vehicle.

The activation of the leveler is effected in a known way at whatever time there are variations in the load of the vehicle, in order to restore the balance between the vehicle load and the air pressure within the air springs and thus re-establish the levelness of the vehicle.

The internal connections of the various chambers of the leveller are so arranged as to facilitate drainage of condensate and oil toward the fittings 5 and 19, which are arranged on the bottom surface of the body A. In such a manner, jamming of the internal movable parts of the apparatus, and in particular of the slidable packings, is prevented in the case of operation after a long stop at temperatures lower than the freezing point of water.

In order to prevent foreign bodies being carried into the leveller by water coming from the reservoirs or the air springs, and which would reduce the life of the leveller on account of their abrasive action, filters are provided, placed within the fittings 5 and 19.

In the example of the FIG. 1, each inlet fitting retains the peripheral edge of a disc type filtering element 36, 37 (for instance, a piece of small gauge wire net) housed in a corresponding circular chamber.

In the alternative embodiment of the invention shown in FIGS. 4 and 5, in which parts corresponding to those of FIGS. 1, 2 and 3 are given the same reference characters primed, the filter 38 is of the cylindrical basket type, having its axis perpendicular to that of the fitting 5'. Filter 38 is housed in a seat 39 provided with two longitudinal projections 40 dividing the seat into two portions in such a manner as to force the air to cross the wall of the filter cartridge 38 and deposit the eventual impurities.

The cartridge is retained by a plug 41 fitted with a gasket 42, so that it is possible to remove the filter for cleaning without demounting the connection fitting 5'.

In practice, the constructional details of the apparatus may vary, without departing from the ambit of the present patent.

I claim:

1. A servo-actuable leveler, for controlling a pressurized fluid suspension system for vehicles comprising, in combination, first and second cylinder and piston assemblies; a first relatively elongated rod means connected to the piston of said first assembly and extending outwardly therefrom; a second relatively elongated rod means connected to the piston of said second assembly and extending outwardly therefrom; means forming an inlet for connection to a source of pressurized fluid; means forming an outlet for connection to the suspension system; means forming an exhaust port; a first normally closed valve means controlling connection of said inlet to said outlet; a second normally closed valve means controlling connection of said outlet to said exhaust port; means connecting said inlet to the cylinders of said assemblies for supply of pressurized fluid thereto to move the cylinders thereof outwardly; respective spring means engaged with said rod means and biasing said rod means to move their respective pistons inwardly of the associated cylinders to a limiting retracted position; said first rod means, upon a predetermined outward movement thereof, engaging said first valve means to open the same, and said second rod means, upon a predetermined outward movement thereof, engaging said second valve means to open the same; rotatable cam means positioned in the path of outward movement of both of said rod means; said cam means having a neutral position and first and second operated positions spaced angularly in opposed directions from said neutral position; said cam means, in its neutral position, engaging said rod means, upon outward movement thereof, to limit such outward movement to a position in which said rod means are ineffective to open the associated valve means; said cam means, in its first operated position, providing for outward movement of said first rod means to a position opening said first valve means while restraining outward movement of said second rod means to a position where it is ineffective to open said second valve means; said cam means, in a second operated position, providing for outward movement of said second rod means to a position in which said second rod means opens said second valve means and restraining outward movement of said first rod means to a position where it is ineffective to open said first valve means; said first and second rod means being moved outwardly upon application of the pressurized fluid to the respective pistons connected thereto and against the force of the respective spring means, the respective spring means, upon interruption of the application of pressurized fluid to the pistons of said assemblies, moving said rod means and the connected pistons to said retracted position.

2. A leveller, according to claim 1, wherein the two rod means have their central axes parallel to one another and perpendicular to the central plane of the axis of rotation of said cam means, the pistons of the rods being arranged at the extremity of the rods opposite from said valve means.

3. A leveller, according to claim 1, wherein the normal attitude of the cam means is symmetrical with respect to the two rod means.

4. A leveller, according to claim 1, wherein the pressurized fluid is compressed air, said leveller including means for facilitating the discharge of condensate.

5. A leveller, according to claim 1, wherein filter means are provided between said source of pressurized fluid and the suspension system of the vehicle.

6. A leveller, according to claim 5, wherein said filter means comprises a discoidal wire element.

7. A leveller, according to claim 5, wherein said pressurized fluid is compressed air and said filter means is cylindrical, said compressed air being forced radially through said filter means.

References Cited in the file of this patent

UNITED STATES PATENTS

| | | |
|---|---|---|
| 987,719 | Hayden | Mar. 28, 1911 |
| 2,947,531 | Deist | Aug. 2, 1960 |
| 3,044,495 | Alfieri | July 17, 1962 |